United States Patent
Okamoto et al.

(10) Patent No.: US 7,856,560 B2
(45) Date of Patent: *Dec. 21, 2010

(54) DIGITAL INFORMATION RECORDING APPARATUS AND RECORDING/REPRODUCING APPARATUS

(75) Inventors: Hiroo Okamoto, Yokohama (JP); Manabu Sasamoto, Yokohama (JP); Atsushi Yoshioka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 362 days.

This patent is subject to a terminal disclaimer.

(21) Appl. No.: 12/020,943

(22) Filed: Jan. 28, 2008

(65) Prior Publication Data

US 2008/0141038 A1    Jun. 12, 2008

Related U.S. Application Data

(63) Continuation of application No. 10/264,377, filed on Oct. 4, 2002, now Pat. No. 7,340,613.

(30) Foreign Application Priority Data

Oct. 5, 2001  (JP) ............................ 2001-309386
Oct. 19, 2001 (JP) ............................ 2001-321322

(51) Int. Cl.
*H04L 9/32*  (2006.01)
(52) U.S. Cl. .................. 713/193; 380/201; 705/51; 705/57; 386/94; 360/60
(58) Field of Classification Search ................ 713/193; 380/201; 705/51, 57; 386/94; 360/60
See application file for complete search history.

(56) References Cited

U.S. PATENT DOCUMENTS 5,896,454 A    4/1999  Cookson et al.

(Continued)

FOREIGN PATENT DOCUMENTS

EP    0849658    6/1998

(Continued)

OTHER PUBLICATIONS

Japan Patent Office (JPO) office action for JPO patent application JP2006-019976 (Aug. 18, 2009).

(Continued)

*Primary Examiner*—Thanhnga B Truong
(74) *Attorney, Agent, or Firm*—Townsend and Townsend and Crew LLP (57) ABSTRACT

In a digital information recording/reproducing apparatus, information recorded on a hard disk with copy restriction thereof is protected from being copied onto other hard disks by means of a PC, etc., to be produced a large number of illegal copies, i.e., infringing a copyright.

The information is recorded onto a hard disk drive through encryption thereof, with using an identification being number unique thereto, when it is recorded onto the hard disk. With this, normal reproduction is prevented, since the drive identification number necessary for decryption is different from, even if it is copied onto the other hard disk. Also, a version information of the hard disc is memorized in an information management circuit. When the information is illegally copied onto the other hard disc, the version information is changes; therefore it does not coincide with the version information memorized in the information management circuit. With this, illegal reproduction of the information copied can be prohibited in the reproducing operation.

21 Claims, 6 Drawing Sheets

U.S. PATENT DOCUMENTS

| | | |
|---|---|---|
| 5,917,910 A | 6/1999 | Ishiguro et al. |
| 6,085,323 A | 7/2000 | Shimizu et al. |
| 6,343,281 B1 | 1/2002 | Kato |
| 6,480,607 B1 | 11/2002 | Kori et al. |
| 6,674,858 B1 | 1/2004 | Kimura et al. |
| 6,711,343 B1 | 3/2004 | Matsumi et al. |
| 6,999,588 B1 | 2/2006 | Oishi |
| 7,254,312 B2 | 8/2007 | Yamada et al. |

FOREIGN PATENT DOCUMENTS

| | | |
|---|---|---|
| JP | 04-98552 A | 3/1992 |
| JP | 10-312335 A | 11/1998 |
| JP | 11-275516 A | 10/1999 |
| JP | 2000-148417 | 5/2000 |
| JP | 2000-339223 A | 12/2000 |
| JP | 2001-71908 A | 3/2001 |
| JP | 2001-245223 A | 9/2001 |
| JP | 2001-298705 | 10/2001 |
| JP | 2002-010189 | 1/2002 |

OTHER PUBLICATIONS

Japan Patent Office (JPO) office action for JPO patent application JP2006-019976 (Mar. 30, 2010).

| TYPE | COPY CONTROL | APS | PAUSE | TIME | BROADCASTING METHOD | PAUSE TIME |
|---|---|---|---|---|---|---|
| 103a | 104a | 105a | 106a | 107a | 108a | 109a |

FIG. 7B

| PROGRAM NO. | SECTOR INFORMATION | TIME INFORMATION | TYPE | COPY CONTROL | APS | PAUSE | RECORDING TIME | BROADCASTING METHOD | PAUSE TIME | USER IDENTIFICATION | ENCRYPTION INFORMATION |
|---|---|---|---|---|---|---|---|---|---|---|---|
| 100 | 101 | 102 | 103b | 104b | 105b | 106b | 107b | 108b | 109b | 110 | 111 |

DIGITAL INFORMATION RECORDING APPARATUS AND RECORDING/REPRODUCING APPARATUS

CROSS-REFERENCE TO RELATED APPLICATION(S)

This is a continuation of U.S. patent application Ser. No. 10/264,377, filed Oct. 4, 2002 which application claims priority from Japan Patent Application Nos. 2001-321322, filed Oct. 19, 2001 and 2001-309386, filed Oct. 5, 2001, the entire disclosure of which is incorporated herein by reference.

BACKGROUND OF THE INVENTION

The present invention relates to an information recording apparatus for recording digital information such as video, voice, etc., or an information recording/reproducing apparatus for the same, and more particularly, the present invention relates to an apparatus for limiting recording of the digital information onto a recording media upon authorities given by the copyright holders, etc.

DESCRIPTION OF RELATED ART

Now that digital TV broadcasting is started, various private-use digital recording/reproducing apparatuses have been put on the market in such package media fields as movie software, etc. so as to cope with such digital broadcasting contents. In the near future, package software to be used for those apparatuses is also expected to appear on the market. The most attractive advantage of such digital broadcasting and digital recording apparatuses is that no or almost no quality degradation is recognized in the respective processes of sending/recording/reproducing. And accordingly, a serious problem comes to arise from such the advantage of those digital apparatuses; a lot of illegal copies are generated from the high quality digital information of the originals with use of those apparatuses, and are sold where the copyright holders do not know, so that no profit is turned back to the copyright holders.

In order to solve such the problem, U.S. Pat. No. 5,896,454 discloses a method for adding 2-bit copy control information to every information item. According to this method, the operation of a recording apparatus is controlled so that any one of the three choices "Copy Never", "Copy Free", and "Copy One Generation" is permitted or selected. The recording apparatus does not work when "Copy Never" is set and starts recording when "Copy Free" is set. If "Copy One Generation" of copies is permitted, the recording apparatus carries out the recording operation after rewriting this control information to "No More copies".

If "Copy Never" is set for the copy control information when in broadcasting, a problem might arise; for example, when the user has a visitor while watching/listening broadcast contents, the user might miss the contents and have no means for watching/listening them later. For example, Japanese Patent Laying-Open No. 2000-149417 (JP-A 149417/2000) discloses a method for solving this problem by means of "Temporary Recording" even when "Copy Never" is set for the copy control information. This is a method for recording physically the desired information on a recording medium once, then the user is enabled to watch/listen the reproduced information for a predetermined period, for example, for just 90 minutes and the information is erased after that. This limit time is called as "retention period". In other words, the method disables the information to be stored for a long time and used in other ways or purposes; it is just equivalent to enabling the broadcast content to be watched/listened with delaying a time within 90 minutes. This method can solve the above-described inconvenience of the user, since the recorded information is not stored for a long time, so that the copyright holder's advantages and/or profits can be protected. The "Temporary Recording" is often set in a hard disk recorder built in the receiver due to the characteristics thereof.

The similar "Temporary Recording" is available also when the copy control information indicates the "Copy One Generation". For example, with provision of a limit, such as of 90 minutes, or the like, and while allowing the copy control information on the recording medium to indicate the "Copy One Generation" during the time limit, it is rewritten to the "No More Copy" after a lapse of the time limit. With this, it is also possible to obtain the effect of delaying the broadcasting, for example by 90 minutes, substantially.

After being rewritten into the "No More Copy", it is impossible to copy the information from the disc onto the tape, for example, even if trying to do so. However, this sometimes gives inconvenience to the user. Then, subjecting to the condition that the information on the original recording medium is made to be non-reproducible, it is permitted to re-record (i.e., move) the information only onto other one recording medium. Thus, exchange-over of the recording media can be made, but without increasing the number of the recording media, i.e., without giving disadvantages onto the copyright holders.

BRIEF SUMMARY OF THE INVENTION

The above mentioning disclosed in the those conventional arts has a function to put the brakes in a certain degree, on the illegal copying produced by combining plural number of the recording/reproducing apparatuses or recording apparatuses, thereby not providing disadvantages to the copyright holders. However in recent years, the apparatus using the hard disk is increasing in the number thereof, as was mentioned in the above. With such the apparatuses, for a person having a knowledge at a certain degree, it is possible to copy all the information onto the other hard disk, easily by a unit of one (1) bit, completely regardless of the copy control information.

For example, the "moving" operation mentioned above is allowed to the information, originally of "Copy One Generation", even after being recorded on the medium, being changed into "No More Copy", upon the assumption that the information on the original recording medium is made to be irreproducible, thereby not increasing the number of the recording media thereof. If the hard disk is removed and mounted onto the PC under the condition that the information of "No More Copy" is recorded thereon, it is possible to copy the information onto other hard disk under the condition of "No More Copies". And, if this is mounted onto the original recording/reproducing apparatus, it means that, not only the information can be reproduced to be watched/listened, but also copy media can be produced in the number of copying thereof onto the hard disks. With this, the assumption of "moving" is destroyed, so that the creators and the copyright holders are suffered with disadvantages.

Of course, such the problem will occur, in the same manner, not only in the case where the recording medium is the hard disk, but also in the case where it is that which is originally made to be removable from the apparatus, for example, an optical disc, such as a CR-RW, or a DVD-RAM, etc., by mounting it onto the drive connected to the PC so as to copy the information to the other recording medium by a unit of one (1) bit.

Accordingly, an object of the present invention is, by taking the problems mentioned above into the consideration, to provide a means for preventing the recording media for the information of "No More Copies" from increasing in the number thereof, even when the hard disk is removed from the apparatus, and also an apparatus, into which is applied such the means.

For accomplishing such the object as was mentioned above, according to the present invention, there is provided a digital information recording apparatus provided with a recording medium drive mounting a recording medium therein, and a device for recording the digital information thereon, comprising: a first encryption key generator circuit for generating at least one of a unique number to said device and a unique number to a user of said device; a second encryption key generator circuit for generating a unique number to said recording medium drive; an encryption circuit for encrypting the digital information inputted to said device, with using both said first encryption key and said second encryption key; and a recording circuit for recording an output of said encryption circuit onto said recording medium.

Further, according to the present invention, there is provided a digital information recording and reproducing apparatus provided with a recording medium drive mounting a recording medium therein, and a device for recording and reproducing the digital information, comprising: a first encryption key generator circuit for generating at least one of a unique number to said device and a unique number to a user of said device; a second encryption key generator circuit for generating a unique number to said recording medium drive; an encryption circuit for encrypting the digital information inputted to said device, with using both said first encryption key and said second encryption key; a recording circuit for recording an output of said encryption circuit; a reproducing circuit for reproducing the digital signal from said recording medium; and a decryption circuit for decrypting said reproduced digital information with using both said first encryption key and said second encryption key.

Also, for accomplishing the above object, according to the present invention, there is further provided a digital recording and reproducing apparatus for recoding and reproducing digital information onto and from a recording medium, comprising: a recording and reproducing circuit for recording and reproducing the digital information onto and from said recording medium, with information relating to recording history onto said recording medium; an information management circuit for storing said information relating to the recording history; and a control circuit for controlling said recording and reproducing circuit and outputting operation thereof, wherein said control circuit compares the information relating to the recording history, which is reproduced from the recording medium, to the information relating to the recording history, which is read out from said information management circuit, whereby controlling to output the information reproduced from said recording medium as a usable information if they are coincident with, while to stop reproducing operation of the information from said recording medium, or operation of outputting the reproduced information as the usable information. Wherein, the information relating to the recording history is, preferably, a version information, which is changed when changing the content recorded onto the recording medium.

BRIEF DESCRIPTION OF THE SEVERAL VIEWS OF THE DRAWINGS

These and other objects, features and advantages of the present invention will become more readily apparent from the following detailed description when taken in conjunction with the accompanying drawing wherein:

FIGS. 7A and 7B are block diagrams for showing configurations of control information signals, according to the present invention, in particular FIG. 7A shows a signal transmitted from the information supply station, and FIG. 7B shows a signal recorded on a recording medium.

DETAILED DESCRIPTION OF THE INVENTION

Hereinafter, an embodiment of the present invention will be described with reference to the accompanying.

While the present invention relates, in particular to digital information recording apparatus or a recording/reproducing apparatus, the whole system to which the present invention applies will be described in prior to the explanation of the apparatus.

Figure 1:
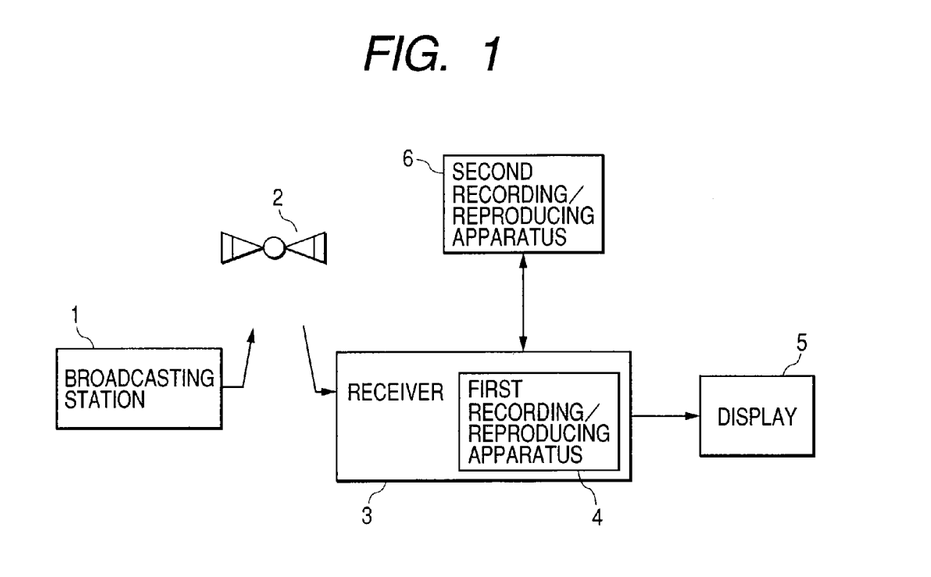
FIG. 1 is a block diagram of a whole digital information sending/receiving/recording system to which the present invention applies.

FIG. 1 is a block diagram for showing the whole system of an embodiment, according to the present invention. The system in FIG. 1 is assumed to send/receive and record/reproduce broadcast information. The system is configured by such an information supply station 1 as a broadcasting station; a relay station 2; a receiver 3; a first recording/reproducing apparatus 4; a display 5; and a second recording/reproducing apparatus 6. Herein, when recording broadcast information in this system, at least one of the first or second recording/reproducing apparatuses 4 and 6 can be used to record information according to the copy control information added to the broadcast information. The first recording/reproducing apparatus 4 employs a digital recording method installed in the receiver 3 here. The recording medium for use in the first recording/reproducing apparatus 4 is that using a hard disk, for example. There are also video disks, video tapes, etc. that are removable for it, however the recording/reproducing apparatus built in the receiver is often used to store information for a short time comparatively, the hard disk is very often used for it, for example, in a case when it is mainly used for the object, "Temporary Recording" as described above. Though the second recording/reproducing apparatus 6 was described to be attached to the receiver 3 on an outside thereof, in the above, however the present invention is still applicable, even under the condition where no such the second recording/reproducing apparatus is provided, or it has no function if being provided.

The information supply station 1 such as a broadcasting station sends signal waves modulated by information via the relay station 2 such as a broadcasting satellite. The signal waves may also be sent via cables, telephones, and land broadcasting, of course. The signal waves received by the receiver 3 at the receiving part is demodulated to information signals as will be described later, and then recorded as proper signals in the first recording/reproducing apparatus 4 and/or the second recording/reproducing apparatus 6 as needed. The signals are also sent to the display 5. Thus, the user can watch/listen the information directly on the display 5. In addition, the information reproduced by the first recording/reproducing apparatus 4 and/or the second recording/reproducing apparatus 6 is outputted onto the display 5 via the receiver 3, thereby the user can obtain restored original video/voice information. When the user obtains information recorded beforehand on a removable recording medium, for example, as package software, the medium is set, for example, in the second recording/reproducing apparatus 6 and the subsequent operations that follow the reproduction are executed in the apparatus 6. Although digital signals are usually sent/received between apparatuses, analog signals are also sent/received between, for example, the receiver 3 and the display 5.

Figure 2:
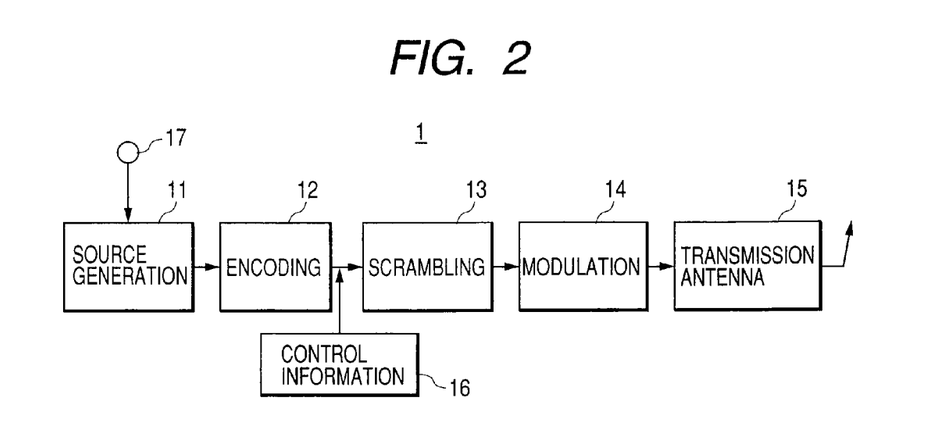
FIG. 2 is a block diagram for showing an example of the structure of an information supply station 1, such as a broadcasting station, shown in FIG. 1.

FIG. 2 shows a block diagram of such an information supply station 1 as a broadcasting station, included in the system described above. The information supply station 1 comprises: a source generator 11; an encoding circuit 12 for compressing information with use of the MPEG method or the like; a scrambling circuit 13; a modulation circuit 14; a transmission antenna 15; a management information adding circuit 16; and an input terminal 17.

Video/voice information, etc. generated in the source generator 11 constituted of a camera, a recording/reproducing apparatus, etc., is compressed by the encoding circuit 12 so that it can be sent in a less-occupied band. The video/voice information is also encrypted in the scrambling circuit 13 so that only specific users can watch/listen the information. The information, after being modulated in the modulation circuit 14 into signals to be sent more appropriately, is emitted as radio waves to the relay station 2 such as a broadcasting satellite from the transmission antenna 15. At this time, the management information adding circuit 16 adds the above-described copy control information, as well as other information such as the current time, etc. to the received information waves. The input terminal 17 receives request information, etc. received via a telephone line, etc. although it is not illustrated in FIG. 1. Such the request information, etc. are used in the system to decide information to be sent out in response to requests from the viewers, such as video-on-demand requests.

Actually, however, a plurality of information items are often multiplexed in one radio wave by means of spectrum diffusion, etc. Although not shown in FIG. 2 to simplify the description, a plurality of systems are prepared for both of the source generator 11 and the encoding circuit 12, so that a multiplexing circuit used to multiplex a plurality of information items is placed between the encoding circuit 12 and the scrambling circuit 13.

Figure 3:
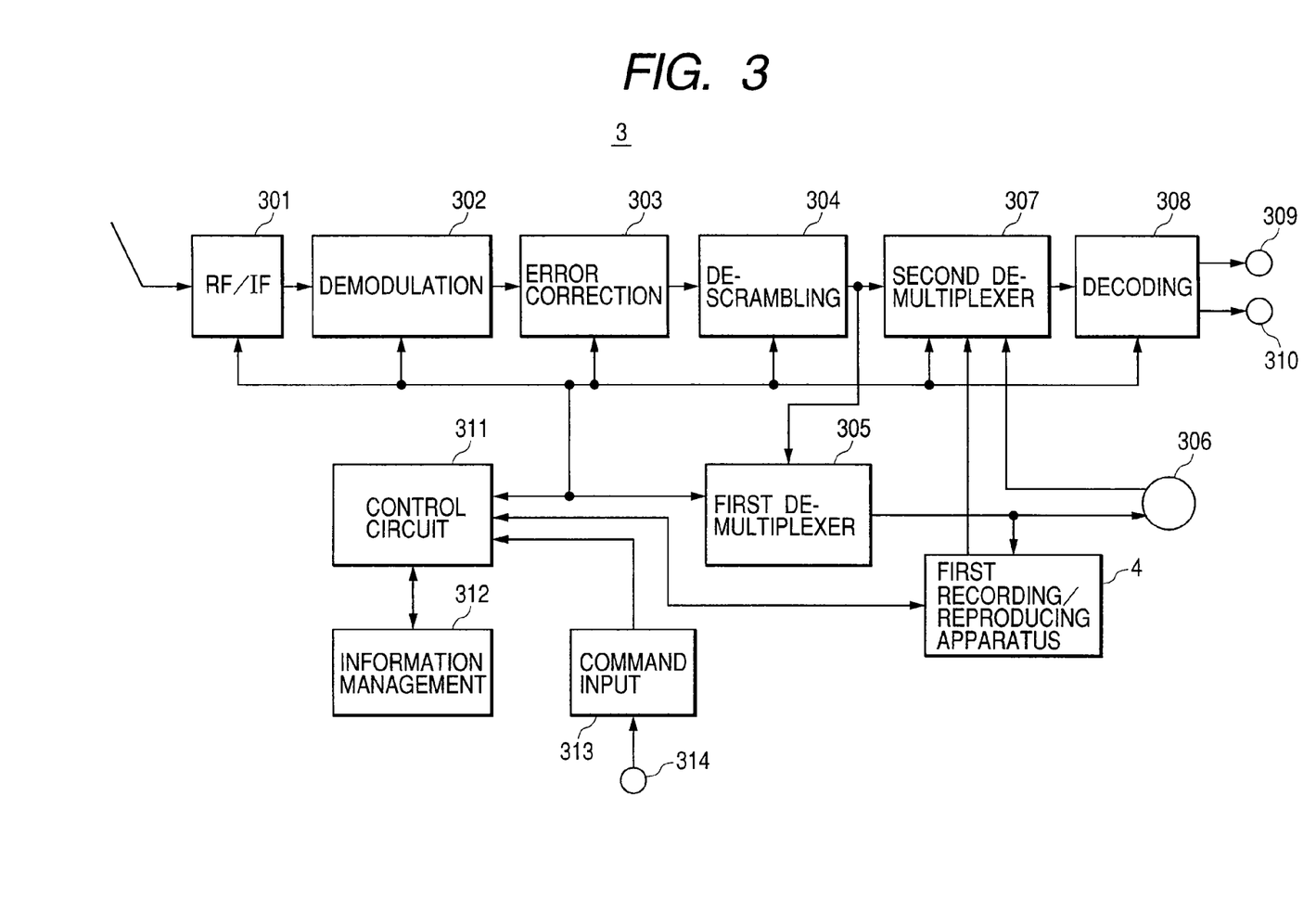
FIG. 3 is a block diagram for showing an example of the structure of a receiver 3 shown in FIG. 1.

FIG. 3 shows a block diagram of the receiver 3 employed in the system shown in FIG. 1. The receiver 3 comprises: an RF/IF conversion circuit 301; a demodulation circuit 302; an error correction circuit 303; a descramble circuit 304 used to decrypt signals; a first demultiplexing circuit 305; an input/output terminal 306; a second demultiplexing circuit 307; a decoder circuit 308; output terminals 309 and 310; a control circuit 311 for controlling the receiver 3 entirely; an information management circuit 312; a command input circuit 313; and an input terminal 314. The first recording/reproducing apparatus 4, as described with reference to FIG. 1, is assumed to be built in the receiver 4. In FIG. 3, a solid line shows a flow of main information such as video/voice information, etc. A dotted line shows a flow of control signal information between component elements.

Hereinafter, the flow of video/voice information indicated by a solid line will be described first with respect to the component elements 301 to 310. The RF/IF conversion circuit 301 receives radio waves transferred from such a relay station as a broadcasting satellite, etc. The frequency of the radio waves in the RF band is converted into an IF band (Intermediate Frequency) frequency or signals within a fixed band independent of the receiving channel. The signals are then demodulated in the demodulation circuit 302 so as to be sent out. Then, code errors that are generated during the transmission are detected and corrected in the error correction circuit 303, then decrypted in the descramble circuit 304. After this, those signals are sent to the first and second demultiplexing circuits 305 and 307. As described above, especially for digital broadcasting, a plurality of information items are often multiplexed in one channel with use of a method of time-division, spectrum diffusion, etc. The demultiplexing circuit is used to separate only desired information from those multiplexed information items. The reason why two demultiplexing circuits are provided in the system is to enable a competing program in the same time-shot to be recorded and enable the first demultiplexing circuit 305 to remove unnecessary worthless information. In other words, such additional information as weather report, program schedule, etc. are often added to the information and such the information is worthy only at that time of broadcasting; they are not worthy to record, so it is erased here.

The output of the first demultiplexer circuit 305 is connected to the first recording/reproducing apparatus 4 so as to be recorded on the recording media therein as needed. The input/output terminal 306 is a bi-directional terminal used to send/receive such digital data to record/reproduce to/from the second recording/reproducing apparatus 6. Generally, the IEEE1394 standard is employed for such the terminal connection. As described above, the second demultiplexer circuit 307 receives information sent from the descramble circuit 304, information reproduced by the first recording/reproducing apparatus 4, or information reproduced by the second recording/reproducing apparatus 6 and sent via the input/output terminal 306. The second demultiplexer circuit 307 can thus select any of those information items and separates the desired information from them. The next decoder circuit 308 decodes motion picture data compressed in prior to the transmission and sends the decoded data to an external apparatus via the output terminal 309/310. The digital broadcasting described above handles HD (High Definition) information having as many as more than 1000 scanning lines and SD (Standard Definition) information having about 500 scanning lines. When the former is defined as HD output and the latter is defined as SD output to correspond to such the two types of information, information from the output terminal 309 may be supplied to HD type displays and information from the output terminal 310 to SD type displays respectively. The information from the output terminals 309 and 310 may be varied such way between digital and analog in accordance with the input of the target display.

Next, the control signal indicated by a dotted line will be described. The control circuit 311 sends/receives control signals to/from each component element (301 to 305, 307 and 308) to control the receiver 3 to execute desired operations. The information management circuit 312 supplies management data to the control circuit 311 in response to the request therefrom. For example, the management circuit 312 manages information of receiving contracts. When a user specifies a desired channel, this specification or instruction is inputted to the input terminal 314 and sent to the control circuit 311 via the command input circuit 313. The control circuit 311 then requests the information of the user's receiving contract to the information management circuit 312. When the user specified channel is contracted, the management circuit 312 sends a control signal to each component element described above to enable the user to receive the channel contents. The information management circuit 312 also manages information of timer reservation by each user. When a reserved time is reached, the control circuit 311 sends a control signal to each component element described above to start a receiving operation.

When the first recording/reproducing apparatus 4 is built in the receiver 3, information is recorded/reproduced according to the user's instruction received via the input terminal 314. This user's instruction is given to the control circuit 311 via the command input circuit 313, to control operation of the first recording/reproducing apparatus 4. Also, as will be mentioned later, sometimes, the control circuit 311 and the first recording/reproducing apparatus 4 may deliver version information of the recording medium, i.e., the hard disk, for example, with each other, depending on other embodiment of the present invention.

Next, the recording/reproducing operation of the digital recording/reproducing apparatus will be described with reference to FIGS. 4 and 5. The first recording/reproducing apparatus 4 and the second recording/reproducing apparatus 6 described above may be basically identical to each other in circuit block configuration, in many parts thereof, and herein is disclosed an embodiment thereof applying the digital recording method therein. In those drawings is mainly shown the embodiment using the digital recording method, however the present invention should not be restricted only thereto. Thus, the recording media of the first recording/reproducing apparatus 4 and the second recording/reproducing apparatus 6 may be the hard disks, and also the present invention may be applicable to those using the easily removable ones, such as the optical discs, the magnetic tapes, etc.

Figure 4:
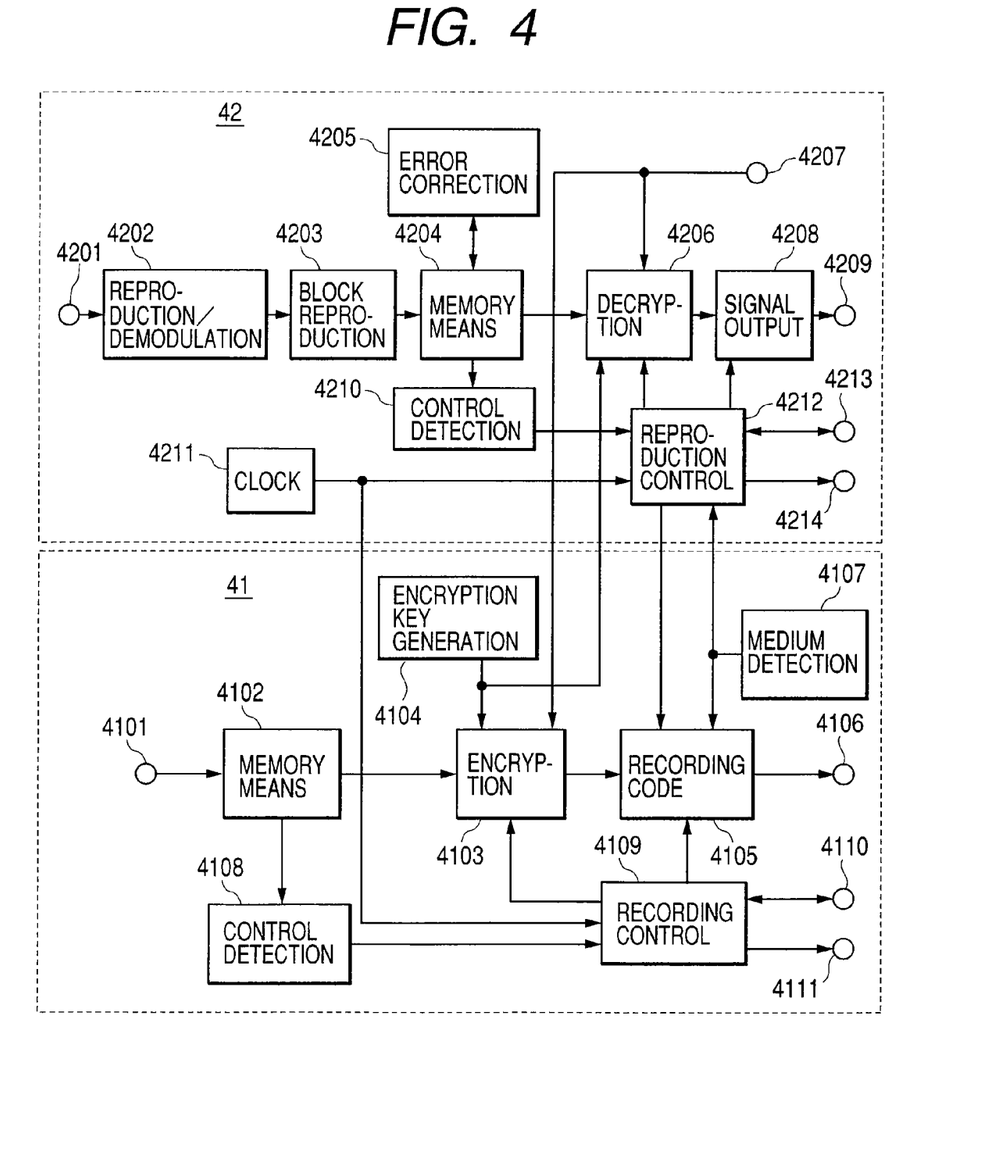
FIG. 4 is a block diagram for showing an example of the structure of a recording/reproducing apparatus 4 shown in FIG. 1.

FIG. 4 shows a block diagram of a digital recording/reproducing apparatus. The recording circuit 41 comprises: a record signal input terminal 4101; a storage 4102 constituted of a semiconductor memory or the like; an encryption circuit 4103; an encryption key input terminal 4104; an encoder circuit 4105; an output terminal 4106 of signals to be recorded on recording media; a media detector circuit 4107; a control detector circuit 4108; a recording control circuit 4109; a control signal input/output terminal 4110; and a control signal output terminal 4111. The reproduction circuit 42 comprises: a storage 4204 constituted of a semiconductor memory or the like; an error correction circuit 4205; a decryption circuit 4206; a decryption key input terminal 4207; a signal output circuit 4208; an output terminal 4209 for sending reproduced signals to a receiver, etc.; a control signal detector circuit 4210; a clock 4211; a reproduction control circuit 4212; a control signal input/output terminal 4213; and a control signal output terminal 4214.

Figure 5:
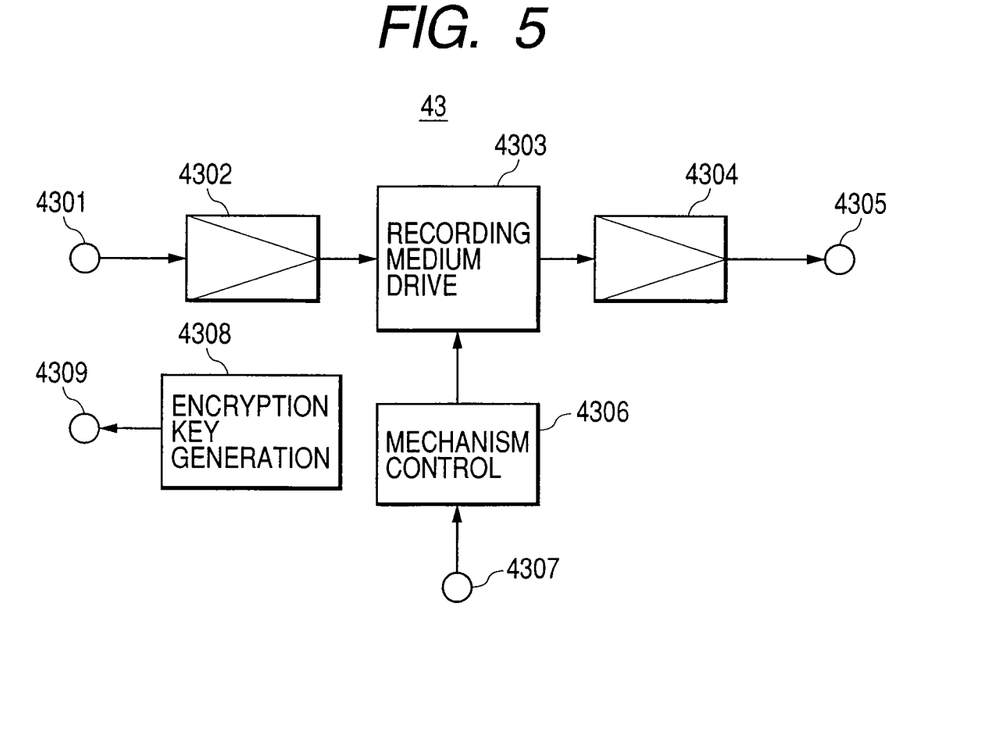
FIG. 5 is a block diagram for showing an example of a periphery of the recording medium of the recording/reproducing apparatus 4 shown in FIG. 1.

FIG. 5 shows a block diagram of a peripheral portion of a recording medium used for the above recording/reproducing apparatus. The recording/reproducing circuit 43, in which a hard disk is adopted as the recording medium, therefore it is corresponding to that, which is generally called by a "hard disk". In the structure, it comprises: an input terminal 4301; a recording amplifier 4302; a recording media drive 4303 in which a hard disk is mounted as the recording medium therein; a reproduction amplifier 4304; an output terminal 4305; a mechanism control circuit 4306; an input terminal 4307; a second encryption key generator circuit 4308; and an output terminal 4309.

At first, the operation of the recording circuit 41 of the recording/reproducing apparatus will be described with reference to FIG. 4. Information to be recorded is inputted to the input terminal 4101 from the first multiplexer 305 shown in FIG. 3. The information is decrypted in the descramble circuit 304. This invention also enables non-decrypted information to be inputted to the input terminal 4101, of course.

This information is also supplied to the second recording/reproducing apparatus 6 via the input/output terminal 306. In addition, the information reproduced by the reproduction circuit 42 (will described later) and output from the output terminal 4209 is also supplied to the input/output terminal 306 shown in FIG. 3. Consequently, in the second recording/reproducing apparatus 6, the input terminal 4101 and the output terminal 4209 may be united into one input/output terminal. Of course, the input/output terminal may conform to the IEEE1394 standard.

Received information is stored in circuits in the storage means 4102. Video/voice digital information, as well as various control information items, which will be shown in FIG. 7A later, are added to the inputted information. For broadcasting, such the control information is added, for example, by the management information adding circuit 16 shown in FIG. 2. The control information is supplied to and detected by the control detector circuit 4108. The recording control circuit 4109 decides on whether to record the signal, as well as whether to encrypt the signal at the time of recording in accordance with this control information. The control circuit 4109 then sends the result to both of the encryption circuit 4103 and the encoder circuit 4105.

On the other hand, video/voice information outputted from the storage 4102 is encrypted, as needed, in the encryption circuit 4103 in accordance with the control signal received from the recording control circuit 4109. Herein is shown an example, in which the encryption is conducted upon the basis of the encryption keys received from the first encryption key generator circuit 4004 and the input terminal of the second encryption key. The former generates a device key, such as an apparatus identification number, etc., and a user key, such as a personal ID read from a user IC card loaded in the apparatus, etc. As will be shown in FIG. 5 later, from the latter is inputted an identification number, which is unique to the hard disk drive to be used, etc. In the case of the "Temporary Recording" when the control information is "Copy Never" that means disabling of recording, or "Copy One Generation" that means enabling of recording only for one generation, or in the case when the information is recorded by rewriting the latter into "No More Copy", both of which require high security, in many cases, the information is encrypted, so as to restrict an extent of use thereof. The encryption may be obtained by encrypting the information with using either one of the first and the second encryption keys and next duplicating the encryption with using the remaining one, i.e., so-called a double encryption, or by encrypting the information with using a new encryption key, which can be obtained through encryption of either one of the encryption keys with using the other remaining encryption key. However, depending on the embodiments, this encryption is not always the condition necessary for, but the present invention may be applied to a case where no such the encryption is made.

Encrypted information is transferred to the encoder circuit 4105. The encoder circuit 4105 shuts off information that is not to be recorded in accordance with the control information received from the control circuit 4109. For the information to be recorded, the encoder circuit 4105 modulates the information in accordance with the medium to be used, and then outputs the modulated information to the output terminal 4106.

In addition to the copy control information, the control circuit 4109 also sends the current recording time output from the clock to the encoder circuit 4105. This current recording time is recorded together with the information to be recorded. The current clock time, when it is included in received information, may be used as it is. The clock 4211 may be calibrated or corrected by the received information.

Furthermore, the information signal outputted from the output terminal 4106 is transferred to the input terminal 4301 of the recording/reproducing circuit 43 shown in FIG. 5. This signal is amplified in the recording amplifier 4302 so as to drive a head for use in the hard disk, and thereafter is recorded onto a recording medium by means of the recording media drive 4303. The control circuit 4306 for mechanisms, such as a motor for driving the recording media drive 4303, controls the recording media in accordance with the control signals received via the input terminal 4307. Also, the second encryption key generator circuit 4308 generates the encryption key upon, such as the unique identification number (for example, the manufacturing number, etc.) of the hard disk drive, to be supplied to the output terminal 4309. This is provided to the input terminal 4207 shown in FIG. 4 mentioned above.

The output of the recording control circuit 4109 shown in FIG. 4 is connected to the output terminal 4111. This output may also be connected to the input terminal 4307 shown in FIG. 5 so as to instruct the mechanism control circuit 4306 to stop the recording operation when recording-disabled information is received such as "Temporary Recording". The input/output terminal 4110 shown in FIG. 4 receives/outputs the control input/output of signals from/to external apparatuses. In the second recording/reproducing apparatus 6 used for such the operation, the input/output terminal 4110 may be used together with the input terminal 4101 and the output terminal 4209 conforming to the IEEE1394 standard.

Next, how to reproduce recorded information in the recording/reproducing apparatus will be described. An information signal reproduced from the recording media drive shown in FIG. 5 is amplified in the reproduction amplifier 4304 up to a level for enabling processing in the subsequent components. The signal is then outputted to the output terminal 4305. The input terminal 4307 receives control signals outputted from the output terminal 4214, and are used to control the mechanism control circuit 4306. The control signals are generated by means of the reproduction control circuit 4212. Usually, both of the recording control circuit 4109 and the reproduction control circuit 4212 are disposed in the same semiconductor device. In this case, the output terminals 4111 and 4214 can be used commonly.

Information signals outputted from the output terminal 4305, shown in FIG. 5, are received by means of the input terminal 4201 of the reproduction circuit shown in FIG. 4. Those signals are then supplied to the reproduction decoder circuit 4202. The signals recorded/modulated in the recording part so as to be recorded/reproduced on/from a recording medium are demodulated here, so as to equalize the waveforms thereof and determine the data with a clock. After this, the sync signal and the ID signal of each of those signals are detected in the circuit reproduction circuit 4203. According to the sync and ID signals, the data to be reproduced is stored once at a predetermined position in the storage means 4204. The error correction circuit 4205 detects code errors generated in the recording/reproducing process through an arithmetic operation of the stored data, and then corrects them to correct values. The error-corrected data is sent to the decryption circuit 4206. This operation is to decrypt the data encrypted in the encryption circuit 4103 in the recording process. Herein, the decryption is conducted by means of the device key for the apparatus, which is supplied from the first encryption key generator circuit 4207, and the user key, such as a personal ID, as well as the second encryption key supplied from the input terminal 4207. For decryption of the encrypted information, the operation mentioned above may be carried out in the reversed relationship to that for the encryption. If those are not the predetermined ones, the decryption is not done normally, thereby disenabling watching/listening of the content thereof. Consequently, though the content can be reproduced, with using the apparatus being in the same condition to that when the recording was made, or only the predetermined user(s) is/are able to watch/listen it by her/himself, however it is difficult to reproduce so as to watch/listen it in other cases.

On the other hand, the control signal detector circuit 4210 detects the copy control information, recording time, etc., from the error-corrected data described above. Then, the reproduction control circuit 4212 decides on whether to output or not the reproduced data according to those information items and the current time obtained from the clock 4211 to control the output of the signal output circuit 4208. The reproduction control circuit 4212 may also start or stop the decryption circuit 4206. For example, a reproduction/watching period is limited as described above, and when this period is over, the signal output circuit 4208 is controlled not to output at least information that can be watched/listened normally. The control information may also be sent from the output terminal 4214 to the input terminal 4307 shown in FIG. 5, so as to stop the reproduction from the recording media drive itself.

When reproduced information output is authorized, including items, such as a version information of the hard disk drive, which will be mentioned later, for example, the information is outputted to the output terminal 4209, then onto the display 5 via the receiver 3 shown in FIG. 1. Data to be compressed with the MPEG method in the encoder circuit 12 shown in FIG. 2 is restored to the original amount thereof by the decoder circuit 308 of the receiver 3. The user is able to thus watch/listen the restored information content. The decoder circuit 308 may be built in the display 5.

When the copy control information is different from that having been described so far, and it is embedded in video information as an electronic "water mark", the same controlling can be made with use of the information detected from this electronic "water mark" at the time of reproduction.

The clock 4211 is naturally required to be of a certain level of accuracy in its operation. Since it is impossible to achieve the object thereof, if the user can change the time easily, with malicious intent. The time should preferably be controlled with the time information received from a broadcasting station, etc. The recording/reproducing apparatus may be configured so that when the time is changed intentionally, the apparatus operation is disabled.

The input/output terminal 4213 sends/receives the control information to/from external apparatuses or the control circuit 311 shown in FIG. 3. For example, the terminal 4213 is used to store the reproduced information in an external recording apparatus. The input/output terminals 4110 and 4213 may be used commonly. Also with the second recording/reproducing apparatus 6, it is possible to send/receive data, including the information of the input terminal 4101 and the output terminal 4209, in a form of only one system in accordance with, for example, the IEEE1394 standard, or send/receive data with use of an infrared beam or the like.

Control signals sent from the reproduction control circuit 4212 to the encoder circuit 4105 are used, for example, to specify erasing of information at the time of reproduction. Concretely, the control signal is used to erase the information that has passed the limit time for watching/listening, or the information that is reproduced once regardless of the limit time. When "moving" some information reproduced to other medium, the information must be erased after being reproduced once. The control signal is also used to erase such the information. When a disk is used as a recording medium, the encoder circuit 4105 generates meaningless signals as information in accordance with this control signal and records the signals, thereby erasing the target information. Alternatively, the control signal may be made unable substantially, by deleting a part thereof. In this case, it is premised that data is erasable from the recording media. The media detector circuit 4107 is prepared for such the processing. The above method is effective for such apparatuses as the second recording/reproducing apparatus 6 that uses removable recording media therein. When recording some information on a condition that the information is to be erased later, the recording is disabled for apparatuses that employ such non-erasable media as CD-R, etc. Similarly, reproduction is disabled for "moving" information from such the non-erasable media. The media detector circuit 4107 sends a control signal to the encoder circuit 4105 and the reproduction control circuit 4212, so as to disable the operations thereof. However, the media detector circuit 4107 is not needed in the case where it is not premised that the recording medium is removable one, as in the first recording/reproducing apparatus 4. This completes the description of the basic reproducing operations with reference to FIGS. 4 and 5.

Next, explanation will be made on effects, according to the embodiment of the present invention, which was shown in FIGS. 4 and 5. In FIG. 4, the digital information to be recorded is encrypted in the encryption circuit 4130, with using both the encryption key, such as the device key from the first encryption key generator circuit 4104 or the user key, for example, and the encryption key, such as the identification number (i.e., the manufacturing number) unique to the hard disk drive, which is supplied from the input terminal 4207 of the second encryption key. For this reason, only a chance for the recorded digital information to be reproduced and to be decrypted correctly in the decryption circuit 4206, thereby to be watched/listened normally, is restricted to the case where it is reproduced from the hard disk, which is used when the recording was done at first. For example, removing the hard disk drive comprising the recording/reproducing portion 43 shown in FIG. 5 from the recording/reproducing apparatus, and then mounting it onto the PC so as to copy the recorded information onto a second hard disk drive, and if the second hard disk drive is mounted back onto the original recording/reproducing apparatus, so as to try reproduction of the recorded information, however the information encrypted cannot be decrypted, therefore the information cannot be watched/listened normally. Accordingly, it is impossible to "moved" the information, such as the "No More Copies", repeatedly, through the PC, as was mentioned previously, thereby to increase the number of the recording media. With this, it is difficult to destroy or loose a primary idea of "moving", i.e., only changing over the recording media to be used, however without increasing the number of the recording media, and thereby bringing about an effect that the advantages of the creators and the copyright holders of the information can be protected. Also, upon conducting the "Temporary Recording" of the information, such as the "Copy Never" or "Copy One Generation", the information cannot be watched/listened normally, since that information copied onto the separate hard disk drive through mounting onto the PC cannot be decrypted, even if being recorded once with encryption in the same manner. In this instance, it is also possible to achieve the effect that the advantages of the creators and the copyright holders of the information can be protected, in the same manner as was mentioned above.

Next, explanation will be given on the operations and the effects of the embodiment, being separate from that mentioned above, to which the present invention is also applied, by referring to FIGS. 3, 4 and 5. The first recording/reproducing apparatus 4 is built within the receiver 3. Accordingly, the control circuit 311 is able to manage or control the history of the recording medium drive 4303 shown in FIG. 5. Thus, when the content recorded on the recording medium is altered or changed, version information of the changed content is generated in the control circuit 311, to be recorded into a management information recording area on the hard disk. This can be achieved through the control circuit 311 generating the version information, which is supplied to the input/output terminal 4110 shown in FIG. 4 to be multiplexed onto the digital information in the encoder circuit 4105. At the same time, this version information is memorized in the information management circuit 312 shown in FIG. 3. When reproducing the information, this version information is detected from the reproduced information by means of the control detection circuit 4210 so as to be supplied to the reproduction control circuit 4212. On the other hand, the version information memorized in the information management circuit 312 is read out, so as to be supplied through the control circuit 311 and the input/output terminal 4213 to the reproduction control circuit 4212, therefore it is possible to determine on whether both are coincident with or not herein. If they are coincident with, the information reproduced is provided at the output terminal 4209, but if not coincident with, the decryption operation is stopped in the decryption circuit 4206, or the outputting operation is stopped in the signal output circuit 4208.

With the operations mentioned above, it is impossible to reproduce the information to be used, which is once copied onto the other hard disc drive by mounting the recording/reproducing portion 43 onto the PC, even if it is mounted onto the first recording/reproducing apparatus 4. Also, if the information once copied onto the other hard disk drive is turned back to the original hard disk drive, again, it is impossible to reproduce it to be used. This is because the information relating to the recording history, such as the version information, etc., is renewed when the information is copied onto the other hard disk drive through the PC or the like, and therefore, if trying to reproduce, the reproduced version information is not coincident with the version information which was memorized in the information management circuit 312. For this reason, the information on the hard disk cannot be used as an available one if it is copied onto the other hard disk drive once, irrespective of the content of the copy control information, and therefore bringing about an effect of inhibiting an increase of the number of the recording media through the "moving" operation. Consequently, it is difficult to destroy or loose the primary or basic idea of "moving", i.e., only changing over the recording media to be used but without increasing the number of the recording media, thereby bringing about the effect that the advantages of the creators and the copyright holders of the information can be protected.

Further, in the embodiment shown in FIG. 4, because the information is encrypted with using the second encryption key unique to the recording medium when it is recorded, therefore with this, it is only possible to protect the information from being reproduced and used, through mounting the hard disk coping it thereon onto other hard disk. However, it is possible to reproduce the information to be used, if the information is turned back to the original hard disk, again. On the contrary, according to the present embodiment, since it is possible to make the operation itself nonsense or meaningless, i.e., removing the information so as to copying it by means of the PC; therefore the advantages or profits of the creators and the copyright holders can be protected more completely.

For an ordinary user, who uses the information but without removing the hard disk drive, the version information recorded in the management region on the hard disk and the version information memorized in the information management circuit 312 are changed, at the same time, every time when new information is recorded additionally, or when the recorded information is deleted. Accordingly, those operations do not bring the information recorded on the hard disk to be un-reproducible and unavailable. Thus, it has a function to give a change in the information recorded on the hard disk, or to prevent it from being reproduced by mounting the hard disk onto the other hard disk derive.

Although the information memorized in the information management circuit 312 is described to be the version information, for example, in the explanation given in the above, however the present invention should not be restricted only to this. Thus, it may be any kind if it indicates the recording process or history of the recording medium, such as the directory information indicative of the contents recorded on the recording medium, i.e., what kind of information is recorded therein, the information of the date and times when the content recorded is renewed lastly, etc., for example. Also, though the explanation was made that the recording/reproducing portion 43 shown in FIG. 5 be constructed with the recording amplifier 4302, the reproduction amplifier 4304, and the mechanism control circuit 4306, and also accompany the second encryption key generator circuit 4308, etc., however the present invention should not be restricted only to that, i.e., it may be constructed with, omitting any one(s) of the constituent elements thereof. The recording medium portion of the hard disk may be alone in the position. If applying the optical disc as for the recording medium, it is needless to say that the recording medium portion is a single boy.

Next, description will be made on other embodiment, according to the present invention. In this case, the encryption key from the input terminal 4207 shown in FIG. 4 is the information, such as the version information mentioned above, which is supplied, not from the second encryption key generator circuit 4308 shown in FIG. 5, but from control circuit 311 shown in FIG. 3. The encryption key may be the information as it is, or may be generated from the information or a part thereof. In this instance, the encryption key is changed every time when the new digital information is recorded additionally or erased, i.e., every time when the version information is changed. For this reason, the information management circuit 312 must memorizes the version information at the time points when the recordings are done, for all the information remaining on the recording disc without being erased. When the information corresponding thereto is erased, the version information at that time will be erased.

Figure 6:
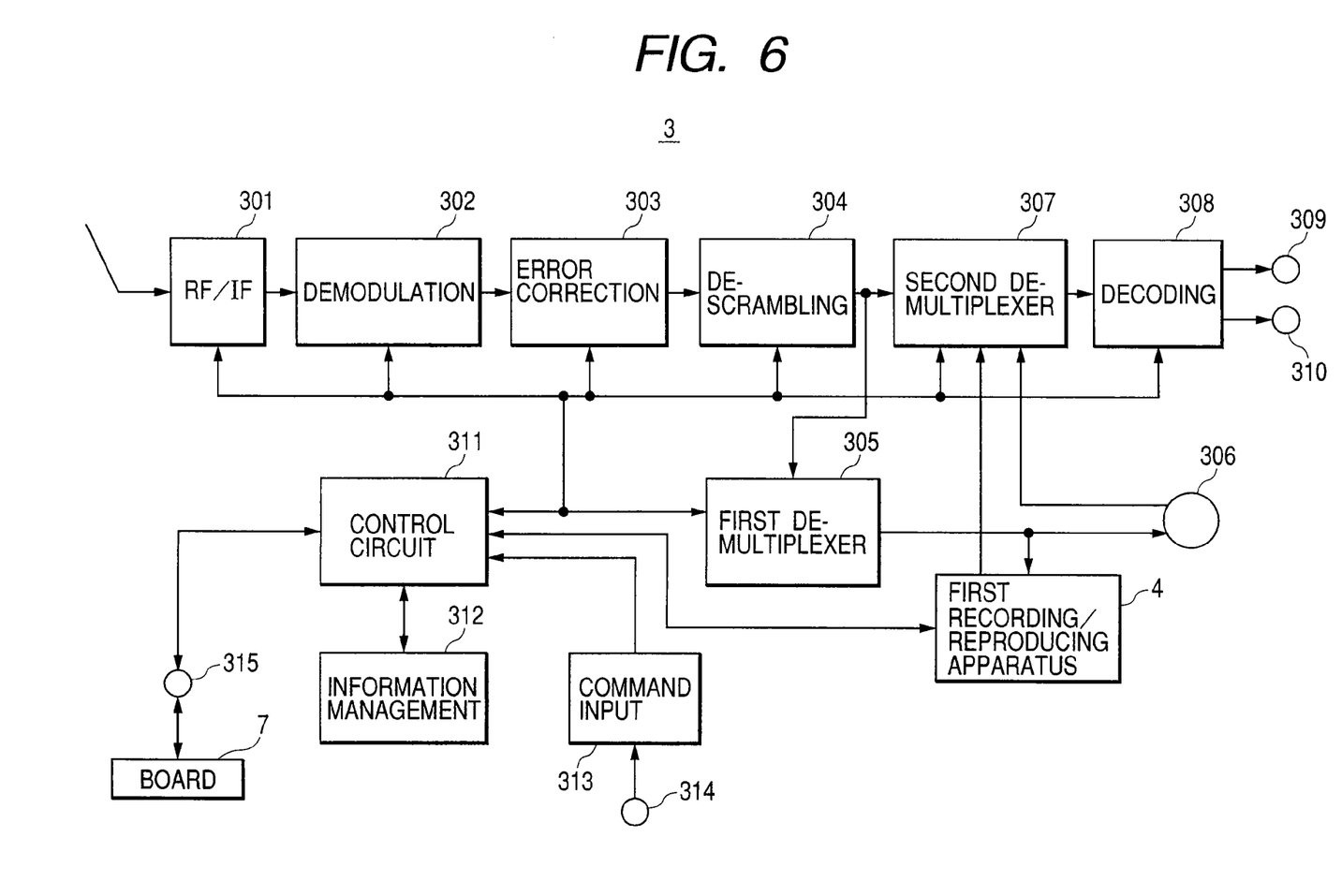
FIG. 6 is a block diagram for showing an example of the structure of the receiver 3 shown in FIG. 1.

Next, explanation will be given on the case where the device for memorizing therein the version information or the like is not built in the receiver 3, but it is attached on an outside thereof, by referring to the circuit block diagram shown in FIG. 6. Differing from that shown in FIG. 3, the control circuit 311 is connected to the output terminal 315, too, thereby transmitting or communicating the information between a board 7 attached onto the outside of the receiver 3. It was explained that the version of the hard disk drive is memorized in the information management circuit 312 in FIG. 3 mentioned above, however it is memorized in the board 7 outside, which is detachable, herein. For this reason, the board has a flash memory or the like therein, for example. This may be in a form of an IC card or the like, for example. Thus, only the specific user(s) who owns the board 7 is able to reproduce the information recorded in the first recording/reproducing apparatus 4, thereby to use it. In the case where the key generated in the first encryption key generator circuit 4101 shown in FIG. 4 is the user key, it may be, not generated therein, but generated from the board, separating from the version information mentioned above. With doing so, it is possible to restrict the use thereof only to a third party(s) owning the board other than the user, thereby enabling protection of the advantages and/or the profits of the creators and the copyright holders, more completely or satisfactory. Also in this case, in the place of the version information mentioned above, the directory information of the recording medium, and the information relating to date (day and time) when the renewal was made lastly on the recorded content thereof.

Furthermore, irrespective of that it is the user key or not, assuming that the encryption key is generated in the board 7, then the object can be achieved if erasing the encryption key on the board 7, when the information is erased from the original medium by "moving" the information from the recording medium to other medium. Thus, the erasing can be simplified in the operation thereof. Of course, also in the case where the encryption key is generated in the information management circuit 3, as shown in FIG. 3, it is enough to erase the encryption key of the information management circuit 312, in the similar cases.

In the explanation given in the above, description was mainly made on the subject, i.e., the first recording/reproducing apparatus 4, which is built in the receiver 3, however the present invention may be applied to the second recording/reproducing apparatus 6, equally, which is attached on the outside thereof.

Figure 7A:
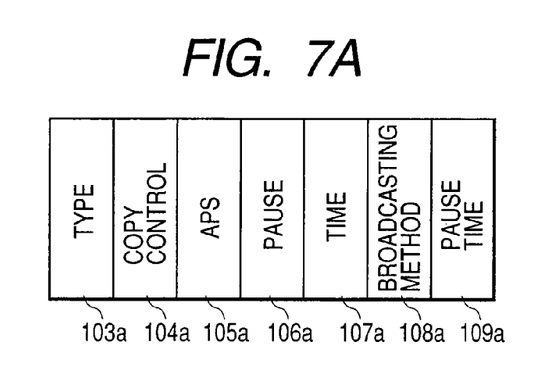
Figure 7B:
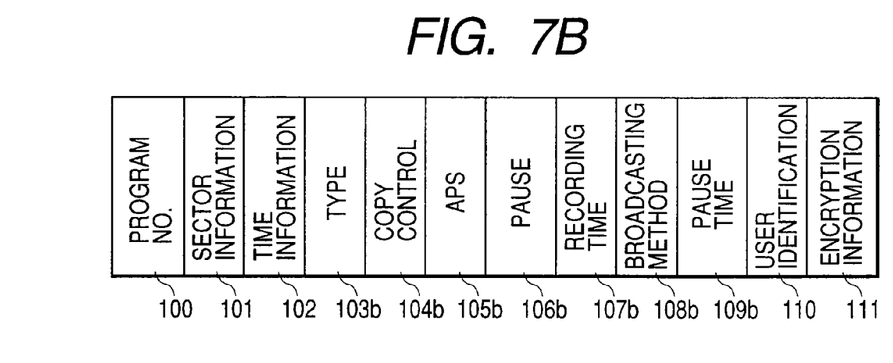

FIGS. 7A and 7B show a configuration of a control information signal employed in this embodiment. Especially, FIG. 7A shows control information received by the receiver 3, which is then inputted to the first recording/reproducing apparatus 4 or the second recording/reproducing apparatus 6, so as to be detected in the control detector circuit 4108 at the recording part. FIG. 7B shows control information updated in the encoder circuit 4105 according to the control information shown in FIG. 7A, which is then recorded on a recording medium together with some contents added thereto. The control information shown in FIG. 7B is previously recorded in package software, etc. In FIG. 7B, the same numbers are given to the similar information items as those shown in FIG. 7A to indicate the correspondence between them. The information to be recorded on a tape medium, shown in FIG. 7B, for example, though being enough that it is recorded on one recording track thereof only by one information item thereof, will be recorded on the medium, but the information is naturally recorded in a definite relationship with video/voice data, etc., so that it can be separated easily at the time of reproduction.

Next, description will be made on the contents shown in FIGS. 7A and 7B in comparison with the circuit block shown in FIG. 4 as needed.

In FIG. 7B, a program number 100 indicates the actual program number on the medium.

Sector information 101 is a sector number of a program divided by a predetermined unit when it is recorded on the medium. The program may be divided into a fixed unit, such as in units of 2K bytes or a unit of information, for example, a unit of dividing at the time of encoding. The number may also be assigned in the subject program and it may be a serial number on the whole recording medium. Such information as a recording time 107b (to be described later) is added for each sector.

Time information 102 indicates a progress of the recording; it indicates a portion of a program up to which the recording is completed. The above information is added when some information is recorded on the medium.

A type 103b indicates attribute information for indicating that the program is sold, rented, created by the user himself/herself, or recorded from broadcasting. As is shown by a reference numeral 103a in FIG. 7A, the attribute information, when it is added in a step of transmission, may be recorded as it is.

Next, a copy control 104a in FIG. 7A indicates whether or not the information may be recorded on the recording medium. Concretely, the copyright holder such as the information creator selects and decides one of the choices "Copy Never", "Copy One Generation (one generation of copies is permitted)", and "Copy Free". In the case of broadcasting, such the copy control is often set by the management adding circuit 16 shown in FIG. 2 mentioned above. The copy control 104b shown in FIG. 7B is updated in the encoder circuit 4105 shown in FIG. 4 as needed when in recording according to this information 104a. When the information 104a indicates "Copy Free", the information may be recorded as it is. When the information 104a indicates "Copy One Generation (one generation of copies is permitted)", it means in principle that the information can be copied once on the condition of "Copy No More (one generation of copies is permitted)". The copy control information is thus updated to "Copy No More" when the information is recorded on a medium. When "Temporary Copy" is enabled, the copy control information is kept at "Copy One Generation (one generation of copies is permitted)" or updated to "Copy No More", then the information is enabled to "Temporary Copy (be recorded temporarily)". When "Copy Never" is set for the control information 104a, the recording is disabled in principle. When "Temporary Copy" is enabled, however, the control information "Copy Never" is kept as it is for recording the target information. When information software is recorded on a medium for supply, the copyright holder records the information when he/she creates the contents. In other words, it is possible to send two-bit information with use of the four states "Copy Never", "Copy One Generation (one generation of copies is permitted)", "Copy No More", and "Copy Free". In this case, it is assumed that (1, 1) is set for "Copy Never", (1, 0) for "Copy One Generation (one generation of copies is permitted)", (0, 1) for "Copy No More", and (0, 0) for "Copy Free".

APS 105a is copy control information (APS; Analogue Protection System equivalent to an analog copy control signal). This information, as is described in Japanese Patent Laying-Open No. Sho 61-288582 (JP-A 288582/1986), for example, is used to control whether to enable copying to an analog recording apparatus, for example, by adding a pseudo pulse to each analog video signal. The information may be recorded as it is, as the APS 105b.

Pause 106a indicates whether to enable "Temporary Recording" when "Copy Never" is set for the copy control information 104a. The "Temporary Recording" is referred to as a pausing function, since it functions just like pausing of broadcasting only for a period. For example, when "Temporary Recording" is enabled, "0" is set and when it is disabled, "1" is set, so that information sending can be controlled with one bit. Consequently, the copyright holder can manage whether to enable "Temporary Recording".

In addition, "Temporary Recording" may be enabled for "Copy One Generation (one generation of copies is permitted)" so as to use this bit to control whether to enable "Temporary Recording". When "1" is set to disable "Temporary Recording", the copy control information is updated to "Copy No More" for recording information. When "0" is set to enable "Temporary Recording", recording is done while the copy control information "Copy One Generation (one generation of copies is permitted)" is kept as it is or it is updated to "Copy No More", then updated to "Copy One Generation (one generation of copies is permitted)" in the signal output circuit 4208 shown in FIG. 4 when reproduced information is outputted within a limit time.

In any case, when "0" is set to enable "Temporary Recording", the "0" may be updated to "1" in the encoder circuit 4105, etc. to record information. This can solve the problem of repeating of "Temporary Recording" in other apparatuses within a limit time.

A time element 107a indicates, for example, the current time of broadcasting set by the management information adding circuit 16 shown in FIG. 2. This current time may be recorded as a recording time 107b as it is or the clock 4211 shown in FIG. 4 may be calibrated or corrected so that the calibrated time is recorded. This recording is done in each of sectors. For example, The time values 107a and 107b are very important for managing the "Temporary Recording" when "Copy Never" is set for the copy control information, although the time for reproducing and watching the target contents is limited.

A broadcasting method 108a indicates a broadcasting method HD (High Definition) information, SD (Standard Definition) information, etc. used for subject information. This information may be recorded as the information 108b as it is.

A pausing time 109a indicates a limit element within which subject content can be reproduced and watched/listened after "Temporary Recording" when "Copy Never" is set for the copy control information. Generally, the limit time is as short as 90 or 120 minutes, so that the user will feel inconvenience sometimes. For example, when "Temporary Recording" is done at midnight, the user must finish watching/listening of the recorded content before she/he goes to bed. To avoid such a trouble, for example, a 3-bit value can be set for the Pause time 109a so that various times can be set. For example, "001" can be set for 90 minutes, "010" for one day, "011" for one week, "100" for one month, "101" for half a year, "110" for one year, and "111" for limitless. Consequently, such the user's feeling of inconvenience caused by the short pausing time can be eliminated under the management of the copyright holder. Such the 3-bit value may be used as the element 109b for recording. This 3-bit information may also be used for "Copy One Generation (one generation of copies is permitted)" that disables "Temporary Recording". In this case, after the "Temporary Recording", the copy control information 104b is kept to be "Copy One Generation (one generation of copies is permitted)" for this period, and then the 104b information is updated to "Copy No More" when the limit time is up. The copy control information 104b may also be updated to "Copy No More" for recording, then it is updated to "Copy One Generation (one generation of copies is permitted)", for example, in the signal output circuit 4208 shown in FIG. 4 so as to output the contents reproduced within the limit time.

In FIG. 7B, sometimes the user identification element 110 is recorded when a user specific code is used to disable reproduction of information except for the same apparatus as that used for recording or only the user of the apparatus.

Encryption information 111 is often used to reproduce encrypted recorded information and decrypt the encryption. When there is much data, the code numbers may be recorded and used to reproduce the corresponding information items stored beforehand in the apparatus.

The user identification information 110 and the encryption information 111 are added when information is to be recorded. However, there is no necessity of recoding them on the recording medium, since the keys to be used for decrypting the encrypted information are generated in the first and the second encryption key generator circuits 4104 and 4108, mainly in the embodiments according to the present invention.

The above information items are recorded at comparatively short time intervals, for example, for each frame of video data, a fixed amount of data, or the like as needed. The configuration of a control information signal shown in FIGS. 7A and 7B is just an example. In addition to the items in the signal, other items related to the configuration and medium such as positions, frequencies, and other items of recording may also be included in the signal. Those items in the signal are not always indispensable in the present invention, however. Some of them may be omitted. The order of those elements in the signal may also be changed.

As described above, according to the present invention, in the recording/reproducing apparatus, which uses the hard disk as the recording medium therein, if trying to reproduce the information by removing the hard disc drive from the recording/reproducing apparatus, thereby to mount it onto the PC to copy it onto the second hard disk drive, and then by mounting the second hard disk drive back to the original recording/reproducing apparatus, again, for reproduction thereof, however since the encryption cannot be decrypted, therefore the reproduced information cannot be watched nor listened normally. Also, according to the present invention, even if the information is copied from the second hard disk drive, turning back to the original hard disk, the encryption cannot be decrypted in the same manner, therefore reproduced information cannot be watched nor listened normally. Accordingly, it is possible to prevent the number of the recording media from increasing due to repetitive "moving" of the information of "No More Copy". And, according to this, the primary or basic idea of "moving", i.e., only changing over between the recording media to be use, can be protected from being destroyed or lost, but without increase in the number of the recording media. Also, according to the present invention, the action of copying by removing the hard disk drive to be mounted to the PC has no meaning by itself, therefore the profits of the creator and the copyright holder of the information can be protected more completely and satisfactorily.

The present invention may be embodied in other specific forms without departing from the spirit or essential characteristics thereof. The present invention embodiment is therefore to be considered in all respects as illustrative and not restrictive, the scope of the invention being indicated by the appended claims rather than by the forgoing description and range of equivalency of the claims are therefore intended to be embraced therein.

What is claimed is:

1. A digital information recording and reproducing apparatus provided with a recording medium drive mounting a recording medium therein, and a device for recording and reproducing copy controlled digital information comprising:

an encryption key generator circuit for generating an encryption key that is unique either to said device or to a user of said device;

an encryption circuit for encrypting the copy controlled digital information inputted to said device by using said encryption key;

a recording/reproducing circuit for recording/reproducing the copy controlled digital information encrypted by said encryption circuit onto/from said recording medium, including information relating to recording history;

a decryption circuit for decrypting said reproduced copy controlled digital information by using said encryption key;

an information management circuit for storing said information relating to recording history; and a control circuit for controlling said recording/reproducing circuit and outputting operation thereof, wherein said control circuit outputs said copy controlled digital information as usable information if information relating to recording history obtained from said recording medium matches information relating to recording history stored in said information management circuit, wherein said control circuit does not output said copy controlled digital information as usable information if said information relating to recording history obtained from said recording medium does not match said information relating to recording history stored in said information management circuit.

2. The digital information recording and reproducing apparatus as recited in claim 1, wherein said information relating to the recording history is version information that is renewed when changing the content recorded onto the recording medium.

3. The digital information recording and reproducing apparatus as recited in claim 1, wherein said information relating to the recording history is directory information of the recording medium.

4. The digital information recording and reproducing apparatus as recited in claim 1, wherein said information relating to the recording history is information indicative of when the recorded content was last renewed.

5. The digital information recording and reproducing apparatus as recited in claim 2, wherein said recording/reproducing circuit records the digital information to be recorded through encryption using said version information as the encryption key, wherein said recording/reproducing circuit decrypts the digital information reproduced using the version information read out from said information management circuit, when reproducing.

6. The digital information recording and reproducing apparatus as recited in claim 5, wherein said information management circuit is able to store the version information in a plural number thereof, as the encryption keys corresponding to a plural number of the digital information, which is recorded on the recording medium and available at that instance, while when making a predetermined information of the plural number of the digital information unavailable, said information management circuit makes the version information unreadable, as the encryption keys corresponding to said predetermined digital information of the plural number of the digital information.

7. The digital information recording and reproducing apparatus as recited in claim 1, wherein said information management circuit is detachable from said digital information recording and reproducing apparatus or an apparatus building it therein.

8. The digital information recording and reproducing apparatus as recited in claim 7, wherein said information management circuit stores further an encryption key being unique to a user, to be used in recording of said digital information.

9. The digital information recording and reproducing apparatus as recited in claim 1, wherein said recording medium is a hard disk.

10. A digital information recording and reproducing apparatus for recording and reproducing digital information on a recording medium therein, comprising:
   an encryption key generator circuit for generating an encryption key that is unique either to said device or to a user of said device;
   an encryption circuit for encrypting the copy controlled digital information inputted to said device by using said encryption key;
   a recording and reproducing circuit for recording and reproducing said copy controlled digital information encrypted by said encryption circuit onto and from said recording medium; and
   an information management circuit for storing information relating to status of said recording,
   wherein reproducing of said copy controlled digital information from said recording medium is disabled or outputting of said copy controlled digital information reproduced from said recording medium as available information is disabled, when status of the recording stored on the recording medium does not match said status of recording stored on said information management circuit.

11. The digital information recording and reproducing apparatus, as recited in claim 10, further including:
   a control circuit for controlling operation of said recording and reproducing circuit, wherein
   said control circuit makes reproducing of the information from said recording medium unable, or makes outputting of the information signal reproduced from said recording medium unable as the available information, when the status of the recording on the recording medium is not coincident with the information relating to status read out from said information management circuit.

12. The digital information recording and reproducing apparatus as recited in claim 10, wherein said information relating to said status of recording is a version information, which is renewed when changing the content recorded onto the recording medium.

13. The digital information recording and reproducing apparatus as recited in claim 10, wherein said information relating to said status of recording is directory information of the recording medium.

14. The digital information recording and reproducing apparatus as recited in claim 10, wherein said information relating to said status of recording is information of time when the recorded content is renewed lastly.

15. The digital information recording and reproducing apparatus as recited in claim 10, wherein said recording and reproducing circuit records the digital information to be recorded through encryption thereof, with using said information relating to said recording status, when recording, while said recording and reproducing circuit decrypts the digital information reproduced with using the said information relating to said recording status, when reproducing.

16. The digital information recording and reproducing apparatus as recited in claim 10, wherein said digital information is recorded under condition of being encrypted, while the information relating to said recoding status includes an encryption key information for encryption therein.

17. The digital information recording and reproducing apparatus as recited in claim 16, wherein when a predetermined information of said digital information is made to be unavailable, the encryption key information corresponding to said digital information is made to be unreadable.

18. The digital information recording and reproducing apparatus as recited in claim 10, wherein said information management circuit is detachable from said digital information recording and reproducing apparatus or an apparatus building it therein.

19. The digital information recording and reproducing apparatus as recited in claim 10, wherein said recording medium is a hard disk.

20. A digital information recording and reproducing method using a recording medium drive mounting a recording medium therein, and a device for recording and reproducing copy controlled digital information, comprising of steps of
   generating an encryption key that is unique either to said device or to a user of said device;
   encrypting the copy controlled digital information inputted to said device by using said encryption key;
   recording/reproducing the encrypted copy controlled digital information onto/from said recording medium, including information relating to recording history;
   decrypting said reproduced copy controlled digital information by using said encryption key;
   storing said information relating to recording history in an information management circuit;
   outputting said copy controlled digital information a usable information if the information relating to recording history obtained from said recording medium matches the information relating to recording history stored in said information management circuit; and
   not outputting said copy controlled digital information as usable information if the information relating to recording history obtained from said recording medium does not match the information relating to recording history stored in said information management circuit.

21. A digital information recording and reproducing method using a recording medium drive mounting a recording medium therein, and a device for recording and reproducing copy controlled digital information, comprising the steps of:
   generating an encryption key that is unique either to said device or to a user of said device;
   encrypting the copy controlled digital information inputted to said device by using said encryption key;
   recording/reproducing the encrypted copy controlled digital information onto/from said recording medium, including information relating to status of recording;
   storing said information relating to status of recording in an information management circuit; and
   disabling reproducing of said copy controlled digital information from said recording medium or disabling outputting of said copy controlled digital information reproduced from said recording medium as available information, when the status of recording obtained from the recording medium does not match the status of recording stored in said information management circuit.

* * * * *

Disclaimer

7,856,560—Hiroo Okamoto, Manabu Sasamoto, both of Yokohama (JP); Atsushi Yoshioka, Ebina (JP); DIGITAL INFORMATION RECORDING APPARATUS AND RECORDING/ REPRODUCING APPARATUS, Patent Dec. 21, 2010. Disclaimer filed Sept. 19, 2011, by the Assignee, Hitachi Ltd.

The term of this patent, subsequent to the patent number 7,340,643 has been disclaimed.

*(Official Gazette January 24, 2012)*